April 15, 1924. 1,490,866

T. VICARS ET AL

BISCUIT OR LIKE EMBOSSING AND CUTTING MACHINE

Filed Dec. 22, 1920 2 Sheets-Sheet 1

Inventors
T. Vicars and
E. L. Vicars

April 15, 1924.　　　　T. VICARS ET AL　　　　1,490,866
BISCUIT OR LIKE EMBOSSING AND CUTTING MACHINE
Filed Dec. 22, 1920　　　　2 Sheets-Sheet 2

Inventors
T. Vicars
E. L. Vicars
Atty

Patented Apr. 15, 1924.

1,490,866

UNITED STATES PATENT OFFICE.

THOMAS VICARS AND EDWARD LYNTON VICARS, OF EARLESTOWN, ENGLAND.

BISCUIT OR LIKE EMBOSSING AND CUTTING MACHINE.

Application filed December 22, 1920. Serial No. 432,589.

(GRANTED UNDER THE PROVISIONS OF THE ACT OF MARCH 3, 1921, 41 STAT. L., 1313.)

*To all whom it may concern:*

Be it known that we, THOMAS VICARS and EDWARD LYNTON VICARS, subjects of the King of England, and residing at Earlestown, in the county of Lancaster, England, have invented Improvements in or Connected with Biscuits or like Embossing and Cutting Machines (for which we have filed application in England June 30, 1919, Pat. No. 154,852), of which the following is a specification.

This invention has reference to biscuit or like cutting or embossing machines, and more particularly those in which springs are used in connection with and housed in casings on the main upper cross head which caries embossing or cutting instruments or appliances, and are supported below, and rods extend up from the outer end parts or slides of the cross head which move up and down in the main bearing frames or guides, and exert an upward pressure on said rods tending to raise the cross head upwards.

According to the present invention, the rods which extend up through and bear on the springs in the housings, are fixed in parts which project from the ends of the cross head, and slide up and down in the main frames of the machine, and extending over the cross head between these two end housings is an entablature or beam, and the rods pass through the centre of the springs, and the housings or cylinders containing same; and one of the chief objects and effects of this invention is to provide improvements in this part of the apparatus by which cleanliness is obtained, viz., it avoids flour and the like being shaken off these parts in working, and getting on the material being operated upon, or moving parts; and furthermore by it the tendency of cross working of the machine due to slight wear in the operating gear, is neutralized to a large extent, and the cutting action of the machine will be rendered more true and perfect.

Figure 1:
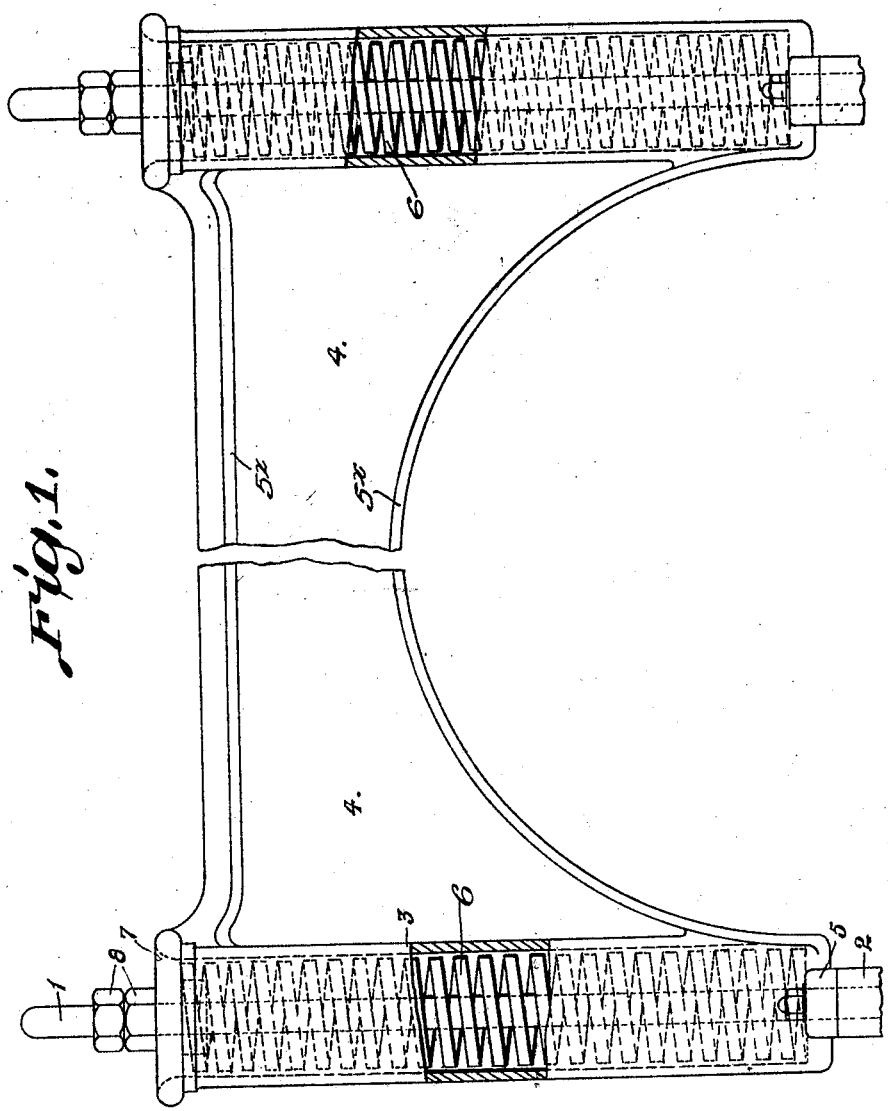
Fig. 1 is a view of the improved cross head.
Figure 2:
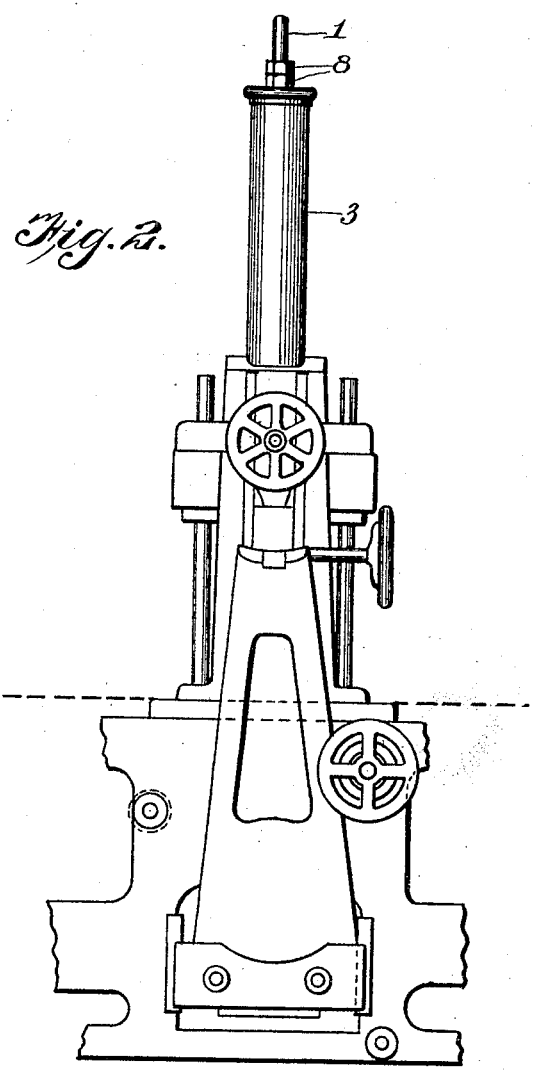
Fig. 2 is an end view of the embossing and cutting machine with the improved cross head applied thereto.

As illustrated in the drawings 1 are the rods which extend up from the embossing cross head, they being fixed below in the slide parts on the ends of the cross head which work up and down in the guide parts therefor on the upper end of the main frames of the machine; and 2 are parts which are fixed on the upper ends of the said guide parts of the main frames in the known way; upon which the spring containing cylinders or casings 3 referred to, are fixed by lugs 5, 4 is the entablature or beam which connects these two cylinders together, all being cut in one; and as seen the beam extends from the lower part of each cylinder to the upper part of same; and has a lower and upper flange or web $5^x$ from cylinder to cylinder.

The springs are indicated by the dotted lines 6; i. e. these lines represent the inside and outside surfaces of the springs, which extend from the closed bottom of the cylinders 3 to the underside of the discs 7 through which the rods 1 pass, and which are held in position and adjusted thereon by the nuts 8, by which means the degree of strain of the springs can be made that which it is desired.

By this construction the objects and effects above referred to, are accomplished.

We claim:

In a biscuit embossing or cutting machine, a cross head including a beam and cylinders carried by the respective ends of the beam, the ends of the beam being substantially of the full length of the cylinders, and said beam being formed near its upper and lower margins having strengthening webs extending from one cylinder to the other.

In testimony whereof we have signed our names to this specification in the presence of two subscribing witnesses.

THOMAS VICARS.
E. LYNTON VICARS.

Witnesses:
G. PERCIVAL MASON,
WM. JNO. JENNINS.